Patented Dec. 12, 1950

2,533,737

UNITED STATES PATENT OFFICE 2,533,737

RESOLUTION OF CRUDE MOTHER LIQUORS OBTAINED IN MANUFACTURE OF PENTA-ERYTHRITOL

Edwin T. Mertz, La Fayette, Ind., assignor to Hercules Powder Company, Wilmington, Del., a corporation of Delaware No Drawing. Application February 1, 1949, Serial No. 74,046

7 Claims. (Cl. 260—637)

This invention relates to a process for resolving into its component materials the waste liquor resultant from the manufacture of pentaerythritol. More particularly, the invention relates to a process for the recovery of pentaerythritol, polypentaerythritols and formic acid salts from such waste liquor.

Pentaerythritol is conventionally produced by the condensation of acetaldehyde with formaldehyde in an aqueous medium containing a condensation catalyst. Alkali metal and alkaline earth metal compounds which are alkaline-reacting in aqueous solution are normally used as condensation catalysts. Thus, the oxides, hydroxides, carbonates, etc. are used. Sodium hydroxide and calcium hydroxide are particularly favored commercially as condensation catalysts for this manufacture. The main reactions taking place in a system of this type are believed to be the following:

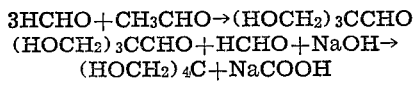

Regardless of the theory of reaction, a metal formate corresponding to the metal ion of the condensation catalyst is always found in considerable quantity in the reaction mixture. At the end of the condensation period, technical pentaerythritol is usually recovered from the reaction mixture by fractional crystallization. Several successive crops of pentaerythritol crystals can be removed from the reaction mixture in this manner. Ultimately, however, there results from the fractional crystallization a mother liquor or waste liquor, oftimes brown in color, from which it is not practical to attempt further recovery of pentaerythritol by fractional crystallization, due largely to the difficulty of inducing crystallization in such waste liquor and the excessive contamination of any products so obtained with metal formates, syrups, etc.

Referring again to the matter of the reactions involved in the manufacture of pentaerythritol, while the aforementioned equations represent the main reactions taking place, it has long been recognized that there are other reactions of significance taking place. Thus, it is known that along with the pentaerythritol monomer formed, there are formed comparatively small amounts of related hydroxylated substances. One of these compounds, dipentaerythritol, is an ether having the following structure:

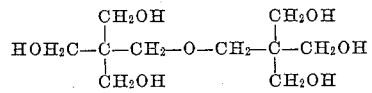

Another related compound, tripentaerythritol, is formed in even smaller amounts. According to the best evidence, it is believed to have the following structural formula:

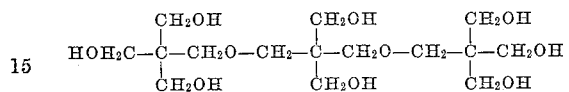

Dipentaerythritol, tripentaerythritol and higher ethers of pentaerythritol may be grouped together under the generic term "polypentaerythritols." In addition to the crystalline pentaerythritol and polypentaerythritols formed in the condensation of acetaldehyde and formaldehyde, there is always formed a certain, and usually substantial amount of noncrystalline syrups. The structure of these syrups is rather controversial. However, there is no doubt but what the presence of these syrups seriously interferes with the resolution of pentaerythritol reaction mixtures into their components.

From what has been said above, it will be apparent that the waste liquors resulting from the manufacture of pentaerythritol and with which this invention is concerned are liquors which have a rather complex array of components: pentaerythritol, polypentaerythritols, noncrystalline syrups, metal formates, etc. Due to the fact that the content of polypentaerythritols of such waste liquors is very small, their presence can for practical purposes be overlooked. It will be recognized too that the proportions of inorganic compounds, i. e., metal formates, to organic compounds (pentaerythritol plus syrupy products) contained in such waste liquors are rather high as compared with the proportions which obtain in the pentaerythritol reaction mixture prior to primary recovery. Similarly, these waste liquors have comparatively high concentrations of noncrystalline syrups.

Several prior art processes have been developed for the recovery of products from pentaerythritol waste liquor. Thus, it has been proposed to fractionally crystallize such waste liquor. Such a process is disadvantageous, however, for the reasons above-mentioned. It has also been proposed to concentrate the pentaerythritol waste liquor to a relatively high solids content and thereafter extract the same with a solvent such as ethanol, etc. in which the pentaerythritol is soluble. Pentaerythritol is then recovered from the alcohol solution by fractional crystallization. This process, however, is likewise disadvantageous in that the pentaerythritol so obtained is contaminated with a relatively large amount of metal formates and hence is entirely unsuitable for many purposes such as the manufacture of high grade synthetic resins. In fact, the metal formate content of pentaerythritol obtained in this manner is usually so high that it is impractical to try to upgrade the product, for example, by treatment with a cation exchange agent to reduce the metal ion content.

Now in accordance with this invention there has been discovered a process for resolving waste liquors obtained in the manufacture of pentaerythritol which provides a pentaerythritol or pentaerythritol-containing product which, as compared with prior art processes, is substantially free of metal formate. This process for the resolution of waste liquor obtained in the manufacture of pentaerythritol and containing pentaerythritol, organic syrups, metal formate and water comprises evaporating said waste liquor to substantial dryness, commingling the resulting dried waste liquor with a solvent selected from the group consisting of secondary and tertiary aliphatic monohydric alcohols of from 4 to 6 carbon atoms, said solvent being employed in an amount not substantially in excess of that required to dissolve all of the pentaerythritol and organic syrups contained in the dried waste liquor at the temperature employed, separating the resulting solution containing dissolved pentaerythritol and organic syrups from the undissolved material comprising metal formate, and recovering from the solution the pentaerythritol and organic syrups in a form substantially free of metal formate.

If desired, the solution of organic matter, i. e., pentaerythritol and organic syrups, can be evaporated to dryness to obtain a pentaerythritol-organic syrup mixture. For some purposes such a mixture is satisfactory and there is no need for resolving this mixture. On the other hand, it is possible to fractionally crystallize the solution of organic matter to obtain a pentaerythritol fraction and an organic syrup fraction. If fractional crystallization is employed, the organic syrup remains in the mother liquor obtained in the last crystallization and it can be separated therefrom by evaporating off the solvent. It will be understood, of course, that the pentaerythritol first obtained as a result of such a fractional crystallization process is not pure pentaerythritol but has associated with it certain organic impurities. It is, however, substantially free of metal formate. If desired, it can be recrystallized one or more times to provide a product having the desired purity. The organic syrup fraction obtained in accordance with the above-described fractional crystallization process is in all probability a very complex mixture. Like the pentaerythritol fraction, however, it will be substantially free of metal formates. Since it is composed largely of polyhydric components, it can be used as a polyhydric alcohol in the manufacture of alkyd resins, etc.

As indicated above, the organic products obtained in accordance with this invention are characterized by being substantially free from metal formates. Thus, as will be evidenced by the specific examples to follow, pentaerythritol waste liquors containing sodium formate as the metal formate can be resolved to provide organic products having as low as 2% sodium formate. Reported recovery processes of the prior art utilizing the extraction principle provide products having 15-20% or more sodium formate. It will be readily seen that the products of the subject invention are of greater utility in the various commercial arts in which pentaerythritol is normally employed as compared with products obtained from prior art recovery processes. This improved utility results from the fact that the presence of large amounts of metal formates in pentaerythritol leads to pentaerythritol derivatives of low quality. The subject process also provides pentaerythritol or related organic products having a sufficiently low metal formate content to make practical the reduction of the remaining metal ion content by treatment with a cation exchange agent such as Zeo Karb H resin. In this manner, pentaerythritol can be obtained from pentaerythritol waste liquors which has as low a metal content as pentaerythritol obtained by primary recovery from a pentaerythritol reaction mixture and which can be equivalently employed in the commercial arts.

By careful operation of the process of the subject invention it is also possible to obtain substantially pure metal formate as one of the products. Thus, in the case of pentaerythritol waste liquors containing sodium formate, sodium formate of 93-100% purity is obtainable.

Having thus indicated the nature and purpose of this invention the following examples are offered to illustrate the practice thereof. All parts are by weight unless otherwise indicated. The "spray dried pentaerythritol waste liquor" to which reference is made in the ensuing examples was obtained by spray drying the waste liquor resultant from condensing acetaldehyde with formaldehyde in the presence of a condensation agent, precipitating the calcium cation by addition of $Na_2CO_3$, and fractionally crystallizing pentaerythritol from the resulting mixture. The waste liquor so obtained was one containing pentaerythritol, organic syrups and sodium formate. The spray dried waste liquor was a light brown powder containing 3% moisture.

EXAMPLE 1

Spray dried pentaerythritol waste liquor was extracted with the following solvents: secondary butyl alcohol, tertiary butyl alcohol and tertiary amyl alcohol. To effect the extractions, a glass extraction apparatus was fitted with a stirrer and suspended in a water bath maintained at a temperature of 80° C. Two parts of spray dried pentaerythritol waste liquor and 10 parts of solvent were charged into the extraction vessel and the contents were agitated at a temperature of 80° C. for 15 minutes. At the termination of the 15 minute extraction period, the suspension was filtered hot by gravity into a tared weighing bottle. After the weight of the filtrate had been determined, each of the filtrates was evaporated to dryness and the residue weighed. From the respective weights of filtrates and residue, the solubility (parts of solute per 100 parts of solvent) of the spray dried pentaerythritol waste liquor in each of the solvents was calculated. The sodium formate content of the extracted solids was determined by ashing the solids in the presence of sulfuric acid and determining the sodium sulfate resulting. The results of the various extractions are tabulated in Table 1.

*Table 1*

| Alcoholic solvent | Parts of Solids Extracted by 100 Parts of Solvent | Per cent Sodium Formate in Extracted Solids |
| --- | --- | --- |
| Tert-butyl Alcohol | 5.0 | 2.0 |
| Tert-amyl Alcohol | 4.7 | 2.0 |
| Sec-butyl Alcohol [1] | 5.9 | 4.0 |

[1] This extraction was carried out at 98° C. rather than at 80° C.

This example demonstrates the unique character of the alcohols with which this invention is concerned as extractants for substantially dry pentaerythritol waste liquor. By utilization of the alcoholic solvents of this invention there may be obtained from pentaerythritol waste liquor an excellent yield of pentaerythritol which contains as little as 2% of sodium formate.

EXAMPLE 2

One hundred parts of spray dried pentaerythritol waste liquor and 1000 parts of tert-butyl alcohol were charged into a two liter, three neck flask fitted with a reflux condenser, a thermometer, and a stirrer. The suspension so formed was refluxed for 30 minutes at 83° C. and filtered hot through a Buchner funnel. This experiment was repeated 5 times to provide 6 separate extracts and 6 separate residues. The 6 extracts were combined and concentrated by evaporation to about 3.8% of their original total weight at which point the reflux temperature was about 85° C. Pentaerythritol precipitated during the course of the concentration. The combined extractions were then dried in a blower-type drier at a temperature of 100° C. The dried product was obtained in an amount representing 92.5% of all the organic material present in the original spray dried waste liquor. It was analyzed with the following results:

*Table 2*

| Per Cent Water | Per Cent Sodium Formate [1] | Per Cent Hydroxyl [2] | Per Cent Pentaerythritol [3] |
| --- | --- | --- | --- |
| 1.2 | 3.3 | 40.2 | 71.5 |

[1] By the sulfate ash method.
[2] By the acetylation method.
[3] By the dibenzal method.

The various residues obtained from the above extractions, after washing with fresh tertiary-butyl alcohol, were analyzed for sodium formate by the sulfate ash method. Values of from 93% to 96% sodium formate were obtained indicating that metal formates of substantial purity can be obtained from pentaerythritol waste liquors in accordance with the process of this invention.

The concentration of the pentaerythritol waste liquor may be accomplished by evaporation or by other methods known to the art. It is, however, necessary to concentrate the pentaerythritol waste liquor to the point of substantial dryness. It is preferred that the pentaerythritol waste liquor as it comes from the pentaerythritol process be concentrated to a point where it contains no more than 5.0% water or moisture. It is still further preferred that the pentaerythritol waste liquor be concentrated to a point where it contains 1.25% or less moisture. It is, of course, particularly important in the concentration of the pentaerythritol waste liquor that conditions effecting decomposition of the constituents thereof are not employed. It has been found that one form of concentration or drying the pentaerythritol waste liquor which is particularly effective for use in connection with this invention is that of spray drying. This is a process in which a solution is sprayed into a chamber through which a stream of hot gas is flowing. The solution is evaporated by the hot gas and the solution solids are collected in the chamber as a finely divided material. Another process which is particularly useful in this connection is that of drum drying. In this process the solution is fed onto one or between two rotating heated drums in such a manner that it coats the drums and is evaporated thereon. A doctor knife scrapes off the resulting dry solids at a convenient point.

The alcoholic extractants which have been found to be particularly advantageous in carrying out the process of this invention are the secondary and tertiary monohydric aliphatic alcohols having from 4 to 6 carbon atoms per molecule. Secondary and tertiary monohydric alicyclic alcohols having from 4 to 6 carbon atoms per molecule are also operable. Exemplary of the operable alcohols are secondary and tertiary butyl alcohols, the secondary amyl alcohols, tertiary amyl alcohol, the secondary hexanols, the tertiary hexanols, cyclopentanol, cyclohexanol and the like. Tertiary butyl alcohol is preferred.

The amount of alcoholic solvent to employ for present purposes can be widely varied. It will be evident, however, that since the metal formates are to some extent soluble in the alcoholic solvents employed, they should be employed in an amount not substantially in excess of that which is required to dissolve all of the organic matter, i. e., the pentaerythritol and organic syrups, contained in the dried waste liquor at the temperature employed. As a practical matter it has been found that from 8 to 15 parts by weight of the alcohol per part of the dried pentaerythritol waste liquor is very effective and is considered the preferred range for operations involving a single extraction. Such proportions apply for operations at a temperature within the range of from 80° C. to the reflux temperature of the mixture. It will be realized, however, that the individual alcohols here involved differ somewhat amongst themselves as to solvent characteristics and the preferred range for any particular alcohol may be at variance with the aforementioned range. It will be appreciated that comparatively small portions of alcohol may be employed and the dried pentaerythritol waste liquor extracted several times with fresh alcohol.

The temperature of extraction may be widely varied and any temperature up to the reflux temperature of the alcohol-pentaerythritol waste liquor mixture. Temperatures within the range of from 50° C. to the reflux temperature of the mixture are preferred due to the fact that at such elevated temperatures the solubility of organic matter in the alcoholic solvent is increased. Such increased solubility decreases the amount of solvent required for substantially complete extraction of organic matter and makes for shorter extraction periods. It will be realized from what has been said that the temperature of extraction, period of extraction and proportions of solvent to dried waste liquor are interrelated factors which must be properly balanced in any practical embodiment of this invention.

Pentaerythritol is obtained from the alcoholic extracts resultant from the extraction step by fractional crystallization. The residual mother liquor resulting from such fractional crystallization contains the organic syrups in alcoholic solution. Upon evaporation of the alcohol, the syrups remain as oily liquids, often dark in color. In preferance to making such a separation, the entire alcoholic extract can be evaporated to remove the alcohol and to provide a mixture comprising the pentaerythritol and the organic syrups. When this alternative is employed, the technique of Example 2 is very effective for removing the alcohol and any water which may be present.

The organic products obtained in accordance with this invention, i. e., pentaerythritol, organic syrups or mixtures thereof are characterized by being substantially free from metal formates. For this reason, the products obtained by virtue of this invention are of greater utility in the various commercial arts in which pentaerythritol is normally employed as compared with similar products obtained from prior art waste liquor recovery processes. The presence of large amounts of metal formates in pentaerythritol leads to pentaerythritol derivatives of low quality. The subject process provides pentaerythritol and related products having a sufficiently low metal formate content to be useful as such in certain commercial applications, as for example in the manufacture of alkyd resins, etc. Furthermore, these products have a sufficiently low metal formate content to make practical the reduction of the remaining metal ion content by treatment with a cation exchange agent such as Zeo Karb H resin. In this manner, pentaerythritol can be obtained from pentaerythritol waste liquor which has as low a metal content as pentaerythritol obtained by primary recovery from a pentaerythritol reaction mixture. An added advantage of the subject process is that it provides a metal formate of high purity.

What I claim and desire to protect by Letters Patent is:

1. A process for the resolution of waste liquor obtained in the manufacture of pentaerythritol and containing pentaerythritol, organic syrups, metal formate and water which comprises evaporating said waste liquor to substantial dryness, commingling the resulting dried waste liquor with a solvent selected from the group consisting of secondary and tertiary aliphatic monohydric alcohols of from 4 to 6 carbon atoms and secondary and tertiary alicyclic monohydric alcohols of from 4 to 6 carbon atoms, said solvent being employed in an amount not substantially in excess of that required to dissolve all of the pentaerythritol and organic syrups contained in the dried waste liquor at the temperature employed, separating the resulting solution containing dissolved pentaerythritol and organic syrups from the undissolved material comprising metal formate and recovering from the solution the pentaerythritol and organic syrups in a form substantially free of metal formate.

2. A process for the resolution of waste liquor obtained in the manufacture of pentaerythritol and containing pentaerythritol, organic syrups, sodium formate and water which comprises evaporating said waste liquor to substantial dryness, commingling the resulting dried waste liquor with a solvent selected from the group consisting of secondary and tertiary aliphatic monohydric alcohols of from 4 to 6 carbon atoms, and secondary and tertiary alicyclic monohydric alcohols of from 4 to 6 carbon atoms, said solvent being employed in an amount not substantially in excess of that required to dissolve all of the pentaerythritol and organic syrups contained in the dried waste liquor at the temperature employed, separating the resulting solution containing dissolved pentaerythritol and organic syrups from the undissolved material comprising sodium formate and recovering from the solution the pentaerythritol and organic syrups in a form substantially free of sodium formate.

3. A process for the resolution of waste liquor obtained in the manufacture of pentaerythritol and containing pentaerythritol, organic syrups, sodium formate and water which comprises evaporating said waste liquor to substantial dryness, commingling the resulting dried waste liquor with a solvent selected from the group consisting of secondary and tertiary aliphatic monohydric alcohols of from 4 to 6 carbon atoms and secondary and tertiary alicyclic monohydric alcohols of from 4 to 6 carbon atoms, said solvent being employed in an amount not substantially in excess of that required to dissolve all of the pentaerythritol and organic syrups contained in the dried waste liquor at the temperature employed, said commingling to be effected at a temperature between 50° C. and the reflux temperature, separating the resulting solution containing dissolved pentaerythritol and organic syrups from the undissolved material comprising sodium formate and recovering from the solution the pentaerythritol and organic syrups in a form substantially free of sodium formate.

4. A process for the resolution of waste liquor obtained in the manufacture of pentaerythritol and containing pentaerythritol, organic syrups, sodium formate and water which comprises evaporating said waste liquor to substantial dryness, commingling the resulting dried waste liquor with secondary butyl alcohol, said secondary butyl alcohol being employed in an amount not substantially in excess of that required to dissolve all the pentaerythritol and organic syrups contained in the dried waste liquor at the temperature employed, separating the resulting solution containing dissolved pentaerythritol and organic syrups from the undissolved material comprising sodium formate and recovering from the solution the pentaerythritol and organic syrups in a form substantially free of sodium formate.

5. A process for the resolution of waste liquor obtained in the manufacture of pentaerythritol and containing pentaerythritol, organic syrups, sodium formate and water which comprises evaporating said waste liquor to substantial dryness, commingling the resulting dried waste liquor with tertiary butyl alcohol, said tertiary butyl alcohol being employed in an amount not substantially in excess of that required to dissolve all the pentaerythritol and organic syrups contained in the dried waste liquor at the temperature employed, separating the resulting solution containing dissolved pentaerythritol and organic syrups from the undissolved material comprising sodium formate and recovering from the solution the pentaerythritol and organic syrups in a form substantially free of sodium formate.

6. A process for the resolution of waste liquor obtained in the manufacture of pentaerythritol and containing pentaerythritol, organic syrups, sodium formate and water which comprises evaporating said waste liquor to substantial dryness, commingling the resulting dried waste liquor with tertiary amyl alcohol, said tertiary amyl alcohol being employed in an amount not substantially in excess of that required to dissolve all the pentaerythritol and organic syrups contained in the dried waste liquor at the temperature employed, separating the resulting solution containing dissolved pentaerythritol and organic syrups from the undissolved material comprising sodium formate and recovering from the solution the pentaerythritol and organic syrups in a form substantially free of sodium formate.

7. A process for the resolution of waste liquor obtained in the manufacture of pentaerythritol and containing pentaerythritol, organic syrups, sodium formate and water which comprises evaporating said waste liquor to substantial dryness, commingling the resulting dried waste liquor with a solvent selected from the group consisting of secondary and tertiary aliphatic monohydric alcohols of from 4 to 6 carbon atoms and secondary and tertiary alicyclic monohydric alcohols of from 4 to 6 carbon atoms, said solvent being employed in an amount not substantially in excess of that required to dissolve all of the pentaerythritol and organic syrups contained in the dried waste liquor at the temperature employed, separating the resulting solution containing dissolved pentaerythritol and organic syrups from the undissolved material comprising sodium formate, recovering pentaerythritol from the solution by fractional crystallization and recovering the organic syrups by evaporating off the solvent from the residual liquor.

EDWIN T. MERTZ.

REFERENCES CITED

The following references are of record in the file of this patent:

UNITED STATES PATENTS

| Number | Name | Date |
|---|---|---|
| 2,360,816 | Wyler | Oct. 10, 1944 |
| 2,407,920 | Cox | Sept. 17, 1946 |
| 2,441,602 | Snow | May 18, 1948 |